United States Patent
Kim et al.

(10) Patent No.: US 10,114,507 B2
(45) Date of Patent: **\*Oct. 30, 2018**

(54) APPARATUS AND METHOD FOR PROCESSING SPLIT VIEW IN PORTABLE DEVICE

(71) Applicant: Samsung Electronics Co., Ltd., Gyeonggi-do (KR)

(72) Inventors: Youngri Kim, Gyeonggi-do (KR); Bonghee Han, Gyeonggi-do (KR); Sungjin Yoon, Gyeonggi-do (KR); Yujin Lee, Gyeonggi-do (KR); Wonkyu Park, Gyeonggi-do (KR)

(73) Assignee: Samsung Electronics Co., Ltd., Yeongtung-gu, Suwon-si, Gyeonggi-do (KR)

( * ) Notice: Subject to any disclaimer, the term of this patent is extended or adjusted under 35 U.S.C. 154(b) by 0 days.

This patent is subject to a terminal disclaimer.

(21) Appl. No.: 15/693,870

(22) Filed: Sep. 1, 2017

(65) Prior Publication Data

US 2017/0364204 A1    Dec. 21, 2017

Related U.S. Application Data

(63) Continuation of application No. 14/861,088, filed on Sep. 22, 2015, now Pat. No. 9,753,573, which is a continuation of application No. 14/026,480, filed on Sep. 13, 2013, now Pat. No. 9,189,061.

(30) Foreign Application Priority Data

Sep. 25, 2012    (KR) .................. 10-2012-0106800

(51) Int. Cl.
    G06F 3/041    (2006.01)
    G06F 3/01    (2006.01)
    (Continued)

(52) U.S. Cl.
    CPC .............. *G06F 3/0416* (2013.01); *G06F 3/01* (2013.01); *G06F 3/04883* (2013.01);
    (Continued)

(58) Field of Classification Search
    CPC .... G06F 3/0488; G06F 3/04883; G06F 3/044; G06F 3/04886; G06F 3/045; G06F 2203/04803
    See application file for complete search history.

(56) References Cited

U.S. PATENT DOCUMENTS

2007/0085759 A1\*  4/2007  Lee .................. G06F 1/1616
                                                          345/1.1
2009/0013282 A1    1/2009  Mercer
(Continued)

FOREIGN PATENT DOCUMENTS

EP    0 422 577 A2    4/1991
EP    2 166 437 A2    3/2010
(Continued)

OTHER PUBLICATIONS

Chinese Search Report dated Sep. 26, 2017.

*Primary Examiner* — Md Saiful A Siddiqui
(74) *Attorney, Agent, or Firm* — Cha & Reiter, LLC.

(57) ABSTRACT

An apparatus and a method for processing a split view in a portable device. The method of processing a split view in a portable device, includes: displaying a plurality of applications as a split view corresponding to split display regions of a display unit; displaying an input panel on a display region of an application of the plurality of applications that did not call for the input panel when the input panel is called; and processing data input through the input panel by an application calling the input panel.

20 Claims, 12 Drawing Sheets

(51) Int. Cl.
*G06F 3/0488* (2013.01)
*H04M 1/725* (2006.01)
*G09G 5/14* (2006.01)
*G06F 3/044* (2006.01)

(52) U.S. Cl.
CPC ........... *G06F 3/04886* (2013.01); *G09G 5/14* (2013.01); *H04M 1/72522* (2013.01); *G06F 3/044* (2013.01); *G06F 2203/04803* (2013.01); *G09G 2340/0464* (2013.01); *G09G 2340/0492* (2013.01); *G09G 2354/00* (2013.01); *H04M 2250/22* (2013.01)

(56) References Cited

U.S. PATENT DOCUMENTS

| | | | |
|---|---|---|---|
| 2010/0066698 A1* | 3/2010 | Seo | G06F 3/04883 345/173 |
| 2010/0088634 A1* | 4/2010 | Tsuruta | G06F 3/0481 715/800 |
| 2010/0214278 A1 | 8/2010 | Miura | |
| 2010/0227650 A1 | 9/2010 | Kim et al. | |
| 2010/0248788 A1 | 9/2010 | Yook et al. | |
| 2011/0109567 A1 | 5/2011 | Kim | |
| 2011/0175930 A1 | 7/2011 | Hwang et al. | |
| 2012/0229374 A1* | 9/2012 | Kobayashi | G06F 1/162 345/156 |
| 2012/0289290 A1 | 11/2012 | Chae et al. | |
| 2013/0002524 A1 | 1/2013 | Sirpal et al. | |
| 2013/0187861 A1* | 7/2013 | Lavallee | G06F 9/543 345/173 |

FOREIGN PATENT DOCUMENTS

| | | |
|---|---|---|
| KR | 10-2011-0063410 A | 6/2011 |
| WO | 2010110613 A1 | 9/2010 |

* cited by examiner

APPARATUS AND METHOD FOR PROCESSING SPLIT VIEW IN PORTABLE DEVICE

CROSS REFERENCE TO RELATED APPLICATIONS

This application is a Continuation of U.S. patent application Ser. No. 14/861,088 filed on Sep. 22, 2015 which claims the benefit the earlier U.S. patent application Ser. No. 14/026,480 filed on Sep. 13, 2013 and assigned U.S. Pat. No. 9,189,061 issued on Nov. 17, 2015 which claims the benefit of priority under 35 U.S.C. § 119(a) of a Korean patent application filed on Sep. 25, 2012 in the Korean Intellectual Property Office and assigned Serial No. 10-2012-0106800, the entire disclosure of which is hereby incorporated by reference in its entirety.

BACKGROUND

Field of the Invention

The present disclosure relates to an apparatus and a method for processing a split view in a portable device. More particularly, the present disclosure relates to an apparatus for displaying an input panel of a split view and a method thereof.

Description of the Related Art

In general, a portable device may concurrently process various composite functions such as communication and multi-media, and may process at least two applications. In this case, a display method of the application processes the applications except for currently executed applications as a background layer. However, in order to display the applications in the background layer, a complex key or a touch interaction for executing an application processed as the background must be performed.

Further, recent electronic devices, such as handheld portable devices, can perform an ever-increasing quantity of various functions, and the size of the display unit has been increased in order to efficiently display multi-media data and because of consumer preference for larger displays. In this case, the display unit may split a screen into views of at least two applications, and display the split application views.

In the aforementioned case of split application views, when activating an input panel in an optional application on a split view, an input panel may be displayed on a region other than a display region of a corresponding application. However, it may be preferable that the input panel is displayed at a fixed position of a split view. In addition, when activating an input panel of an application in a portable device having a display function, the split view may extend to a display region of another application of an adjacent split view.

SUMMARY

The present invention provides an apparatus capable of displaying an input panel while ensuring a display region of an application on a split view in a portable device displaying a plurality of applications on a split view, and a method thereof.

The present invention further provides an apparatus capable of providing an input panel for display while ensuring a display region of an application activating an input panel in a portrait split view mode and a method thereof.

The present invention further provides an apparatus capable of providing an input panel for display while ensuring a display region of an application activating an input panel in a landscape split view mode and a method thereof.

In accordance with an aspect of the present invention, a method of processing a split view in a portable device may include: displaying a plurality of applications as a split view corresponding to split display regions of a display unit; displaying an input panel on a display region of an application not calling the input panel when the input panel is called; and processing data input through the input panel by an application calling the input panel.

In accordance with another aspect of the present invention, a method of processing a split view in a portable electronic device, such as a handheld device, may include: displaying a plurality of applications as a split view in a portrait mode corresponding to split display regions of a display unit; analyzing a position of a split view of an application calling an input when the input panel is called; displaying the input panel to be overlaid with the application displayed on a bottom split view when the application calling the input panel is an application on a top split view; lifting the bottom split view to having a size of the input panel to display the input panel when the application calling the input panel is an application on a bottom split view; and processing data input through the input panel by an application calling the input panel.

In accordance with another aspect of the present invention, an apparatus for processing a split view in a portable device may include: a display unit displaying a plurality of applications as a split view corresponding to split display regions of the display unit; an input unit generating an input for calling an input panel; and a controller controlling to display an input panel on a display region of an application not calling the input panel when the input panel is called, and to process data input through the input panel by an application calling the input panel.

BRIEF DESCRIPTION OF THE DRAWINGS

The present invention will be better appreciated by a person of ordinary skill in the art from the following detailed description in conjunction with the accompanying drawings, in which.

DETAILED DESCRIPTION

Exemplary embodiments of the present invention are described with reference to the accompanying drawings in detail. The same reference numbers are used throughout the drawings to refer to the same or like parts. Detailed descriptions of well-known functions and structures incorporated herein may be omitted when the inclusion of such well-known functions and structures might obscure appreciation of the subject matter of the present invention by a person of ordinary skill in the art.

The portable device according to an embodiment of the present invention may configure a display of at least two applications as a split view to display the split view. When an input panel is activated from an optional application displayed as the split view, the present invention may display the input panel while ensuring there is also a display region of a corresponding application. In this case, the split view includes at least two views which overlay with each other, or are aligned on the same layer. The split view may have a related execution function. When a terminal enabling a split view "calls" an input panel from an optional application displayed as the split view, the embodiment of the present invention maintains a view split state that does not change the size of a region on which an application calling the input panel is displayed, and arranges the input panel. In this case, the arrangement of the input panel configures a split view so that the size of a display region of an application calling the input panel maintains (or is not reduced) and an input panel is displayed at a region displaying another application. In this case, a display region of an application on which the input panel is displayed maintains the smallest view size of the views. The method of displaying an input panel according to the embodiment of the present invention may horizontally or vertically move a display region of an application according to a display mode to configure arrangement of the input panel, and configure the arrangement of the input panel by exchanging the display regions of the application.

As used herein, a person of ordinary skill in the art will understand and appreciate that the term "split view" refers to a view displayed on one layer by splitting a plurality of (at least two) applications. As used herein, a person of ordinary skill in the art will also understand and appreciate that the term "touch interaction" means a hand touch input and a pen touch input generated on a first input unit 140 or a second input unit 150 by a user. Hereinafter, an application and "app" may be compatibly and even interchangeably used with each other.

Figure 1:
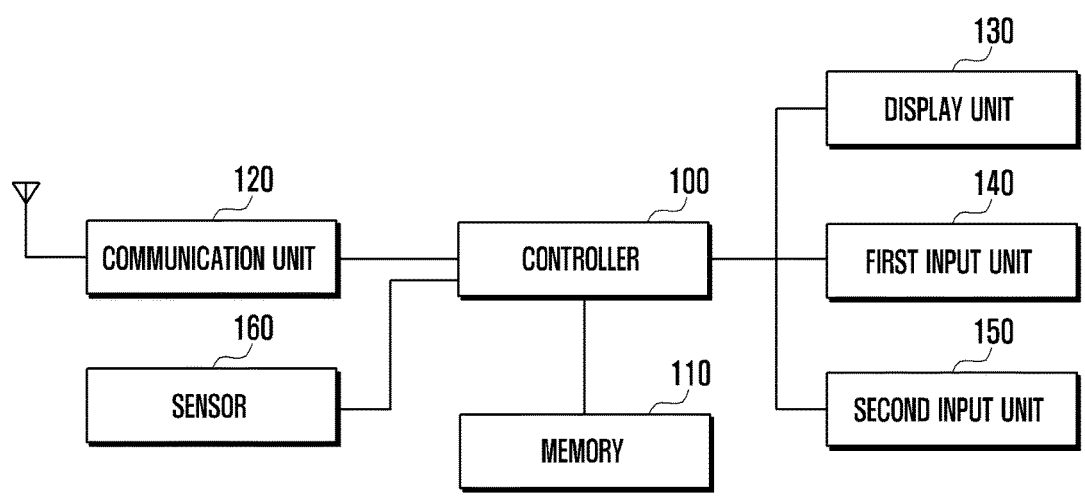
FIG. 1 is a block diagram illustrating a configuration of a portable device according to an exemplary embodiment of the present invention.

FIG. 1 is a block diagram illustrating a configuration of a portable device according to an exemplary embodiment of the present invention. The portable device may include various digital devices that may be handheld, such as a portable phone including a smart phone, an MP3 terminal, a tablet device, phablet and a computer.

Referring now to FIG. 1, a communication unit 120 performs a wireless communication function with a base station or another device. The communication unit 120 may include at least one of an RF transmitter for up-converting a frequency of a transmitted signal and amplifying the converted signal, an RF receiver for low-noise-amplifying a received signal and down-converting the amplified signal, or a transceiver having both transmission and reception capability. Further, the communication unit 210 may include a modulator and a demodulator. The modulator modulates and transfers a transmitted signal to the transmitter, and the demodulator demodulates a signal received through the receiver. In this case, the modulator and the demodulator may include an LTE, a WCDMA, a GSM, a WIFI, and a WIBRO, an NFC, and a Bluetooth. It is assumed in an embodiment of the present invention that the communication unit 120 may include one or more of LTE, WIFI, and Bluetooth communication units.

A controller 100, which includes circuitry such as a processor, microprocessor, sub-processor, which be in an integrated circuit, controls an overall operation of the portable device, and controls an operation displaying an input panel according to calling of an input panel of an application displayed as a split view. When the input panel is called from an optional application displayed as the split view, the controller 100 maintains a view split state by not changing the size of a region on which an application calling the input panel is displayed and controls to arrange the input panel. To this end, the controller 100 may horizontally or vertically (or a combination thereof) move a display region of an application according to a display mode to configure an arrangement of the input panel, and to configure the arrangement of the input panel by exchanging the display regions of the application.

A memory 110, which comprises a non-transitory machine readable medium may include a program memory storing machine readable code an operation program of the portable device and a program according to the embodiment of the present invention, and a data memory for storing data that may or may not be in the form of data storage tables for operating portable device and data created during execution of a program.

A display unit 130 includes a display screen and displays information on an executed application under control of the controller 100. The display unit 130 may include an LCD screen or an OLED screen, for example. The first input unit 140 in this illustrative description may be implemented by a capacitive type or a resistive type, and outputs location information of user touch (referred to as 'finger touch') to the controller 100. It is also possible to use an optical type input unit. Also, as used herein the term "touch" also includes "near-touch" where physical contact is not made but the body part of stylus, for example, comes within a sufficient distance for the surface to detect the presence of the body part of stylus above the surface and is considered a touch by the device. A second input unit 150 may include, for example, an EMR sensor pad, and detects and outputs a pen touch input to the controller 100. The first input unit 140 and/or the second input unit 150 may receive or detect a touch or near-touch and generate interaction or command for calling an input pattern of the split view according to a user input. The display unit 130, a touch panel 140, and an ERM panel 150 may be integrally configured.

The sensor 160 includes hardware for detecting a location of the portable device. The sensor 160 detects the location of the portable device in order to generate a split view display mode of the display unit 130. In other words, the controller 100 analyzes an output of the sensor 160. When the portable device is vertically oriented, the sensor 160 detects the display mode of the display unit 130 as a portrait mode. When the portable device is horizontally oriented, the sensor 160 detects the display mode of the display unit 130 as a landscape mode. The sensors may include but are not limited to an acceleration sensor, a geomagnetic sensor and/or a position sensor.

Figure 2:
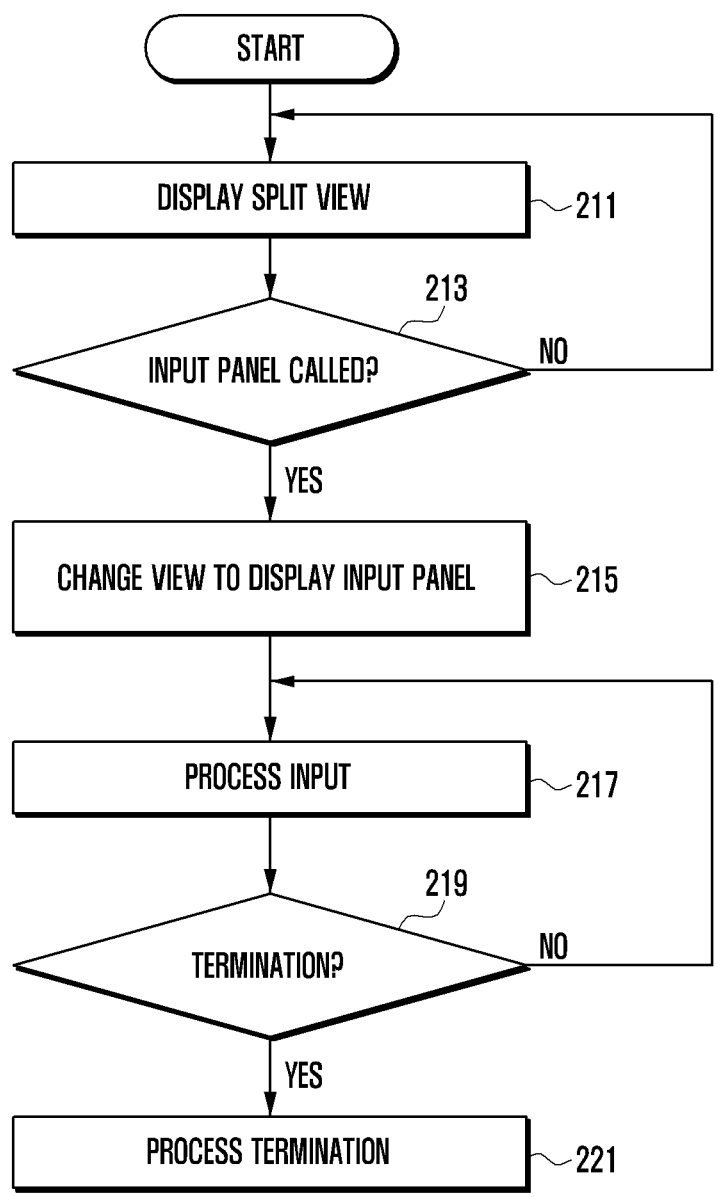
FIG. 2 is a flowchart illustrating operation of a method of displaying an input panel in a portable device having a split view display function according to an exemplary embodiment of the present invention.

FIG. 2 is a flowchart illustrating operation a method of displaying an input panel in a portable device having a split view display function according to an exemplary embodiment of the present invention.

Referring to FIG. 2, at (211) a controller 100 configures a layout and displays a split view for displaying at least two applications on one screen. In this case, the split views display corresponding applications. In addition, the split views display a plurality of applications, and the split views may be displayed in various forms. For example, upon configuring the split view, the controller 100 analyzes an output of the sensor 160 to set a split view in a portrait mode, or a landscape mode, in accordance with a state of the portable device (e.g. the device is oriented in a landscape mode, or a portrait mode, etc.).

First, there can be a user selection of desired apps from among previously-stored apps in a memory of the portable device to display as a split view, (or one of the apps, for example can be obtained from another source). In this case where the apps were fro, the memory of the portable device, preferably, the user collects apps in order to select the apps to be displayed as the split view. In this case, a touch interaction for collecting apps to be displayed as the split view may be set. It is assumed in the non-limiting embodiment of the present invention that the app collection touch interaction is in this example a "pinch close". Accordingly, when the user performs a pinch close operation, the first input unit 140 detects the performing of the pinch close operation and outputs a detection result to the controller 100, and the controller 100 detects the performance of the pinch close operation and displays a plurality of apps on the display unit 130. In addition, the apps displayed on the display unit 130 may include currently running applications, recent applications, or an entire app (e.g., applications displayed on a home screen). In this manner, if the user selects specific apps in a state where collected apps are being displayed, the controller 100 may display the selected apps on the display unit 130 as a split view.

Second, specific apps may include, for example, app switch task information where switch to another app is necessary. The app switch task information may include, for example Insert/Attach/Link/Preview/Browse. For example, a chatting app (e.g., chat on application) may link with a multi-media app (e.g., gallery application) so that information, such as a photograph, can be transmitted during chatting. An e-mail app may link, for example, with an Internet app according to hyperlink information. Accordingly, if an app having app switch task information is selected, the controller 100 may call an app corresponding to the app switch task information, and displays the selected app and the app according to the app switch task information on the display unit 130 as a split view.

Third, an application developer, the manufacturer of an electronic device, or a user may display the split view by setting specific apps. In this case, information on apps set as being displayed on the split view may be stored in the controller 100 for subsequent retrieval. Further, if a corresponding app is selected, the controller 100 detects that a split view display app is selected and displays the apps set corresponding to the app on the screen as the split view. The apps set by the manufacturer of an electronic device, for example, or the user, may include an app (e.g., e-book application) displaying a text, a dictionary app, a map app, a web app, and a note app, just to name some non-limiting possibilities. The note app is an app capable of performing memo or note using a pen or a key pad, and may be used to note information necessary while performing apps such as a text, a schedule, and/or multi-media.

In a state in which the above split view is displayed, the controller 100 displays an executed application on a corresponding split view. Further, the user may execute various operations while confirming an application displayed on the split view.

At (213), when the user selects a data input window of an application in a predetermined position of the split view, the controller 100 detects that an input panel is called. Data signifying various information such as characters, numbers, figures, and/or gestures may be input through the first input unit 140 and/or the second input unit 150. Hereinafter, there is an assumption that the data are characters.

With further reference to FIG. 2 and (213), a character input window may include an input window capable of performing search, data input/change/edit in an application. Accordingly, if the user selects an input window of a specific application from a plurality of application views displayed on respective split views, the controller 100 detects the selected input window through the first input unit 140 or the second input unit 150, and determines that the input panel is called from a corresponding application.

The input panel may include, for example, a 3*4 key pad (or keyboard) or a qwerty key pad (or keyboard), just to name some non-limiting possibilities. In this case, the input panel may include an input panel (static SIP (soft input panel)) displayed at a fixed position or an input panel (floating SIP) having a position and a size which may be changed according to user selection. Further, the controller 100 may differently set a position on which the input panel is displayed according to a display mode of the split view. The display mode may include a portrait mode and a landscape mode. The controller 100 may detect a direction in which the portable device is oriented or located through the sensor 160 to determine a display mode (portrait mode or landscape mode) of the display unit 130.

When providing display of the input panel according to an embodiment of the present invention, if the display mode is the portrait mode, the input panel is arranged at a bottom region of the display unit 130. If the display mode is the landscape mode, the input panel is arranged at an application (that is, another application adjacent to the application calling the input panel) opposite to the application calling the input panel. Further, a current portable device provides one hand mode. In this case, when a user is right-handed, the controller 100 displays an input panel at a right bottom region of the display unit 130. When the user is left-handed, the controller 100 may control to display the input panel at a left bottom region of the display unit 130.

Accordingly, at (213) if a call of the input panel is detected, then at (215) the controller 100 changes a screen to display the input panel so that a screen of a region on which the application calling the input panel is displayed is not covered with the input panel.

For example, when the display mode is the portrait mode and an input panel is called from an application where a split view is arranged at a bottom region of the display unit 130, at (215), the controller 100 lifts a display region of the bottom application by changing the size of an top input panel, or changes an input position of a split view of an application to display the input panel at a bottom display region. Further, when the display mode is the landscape mode, the controller 100 displays the input panel at a region on which an application opposite to the application calling the input panel is displayed.

For example, when the input panel is called from an application of a split view arranged in a left region of the display unit 130, the controller 100 displays the input panel at a position of a split view of a right application.

The display of an application (that is, application not calling the input panel) can be covered or moved by the input panel. The application is displayed for the purpose of calling another application in a state that the input panel is displayed.

More particularly, if a region on which an application not calling the input panel is selected in a state that the input panel is displayed, the controller 100 may display a corresponding application to have the original split view. Accordingly, when two split views are displayed, it is an option that the size of the input panel may be set to have a size smaller than a size of the split view. In addition, when the input panel is displayed, the controller 100 displays the input panel and the application calling the input panel on the display unit 130, and also the display of some of applications not calling the input panel on a remaining display region of the display unit 130. Upon adjusting the layout of a split view including the input panel, the controller 100 may set or adjust a display region of the applications not calling the input panel to the smallest adjustment region, or may adjust the display region of the applications not calling the input panel to be smaller than the smallest adjustment region. The smallest adjustment region refers to a region having an App view form to the smallest region capable of using a displayed App. When the display region of the applications not calling the input panel becomes smaller than the smallest adjustment region, the display region is converted into the form of an icon or minimized so that an App may be identified in even a small region.

Further, if the input panel is called in a state that the display region is displayed as at least having three split views, the controller 100 may split and display the applications not calling the input panel to have the same size at a region between the input panel and a display region of the applications calling the input panel.

At (217) an input is processed by the controller.

With continued reference to FIG. 4, at (219) if a termination command is generated while displaying the input panel of the split view to control the operation of the split view, the controller 100 detects the termination command, and at (221) processes the termination. The termination processing terminates display of the input panel according to the termination command and returns to a display procedure of the split view at (211) before displaying the input panel, and/or may terminate processing of the split view and display operation.

As described above, the method of displaying a split view in a portable device according to the embodiment of the present invention may be changed according to a portrait mode and a landscape mode. More particularly, in a case of the portrait mode, when an input panel is called from a split view region of a bottom region, as described above, the controller 100 may display the input panel as the input panel lifts a split view (1/N Split), and exchanges display regions of an application displayed on top and bottom split views to be displayed. Moreover, in the case of landscape mode, when the input panel is called from a split view region of a right region, as described above, the controller 100 displays the input panel at a right side of the display unit 130, and exchanges display regions of an application displayed on left and right split views so that a display region of the application is not covered with the input panel.

The input panel may be called from an application displayed on a position other than a region on which the input will be displayed in the portrait and landscape modes. In this case, the input panel may be displayed by being overlaid with a display region of a corresponding application.

Figure 3:
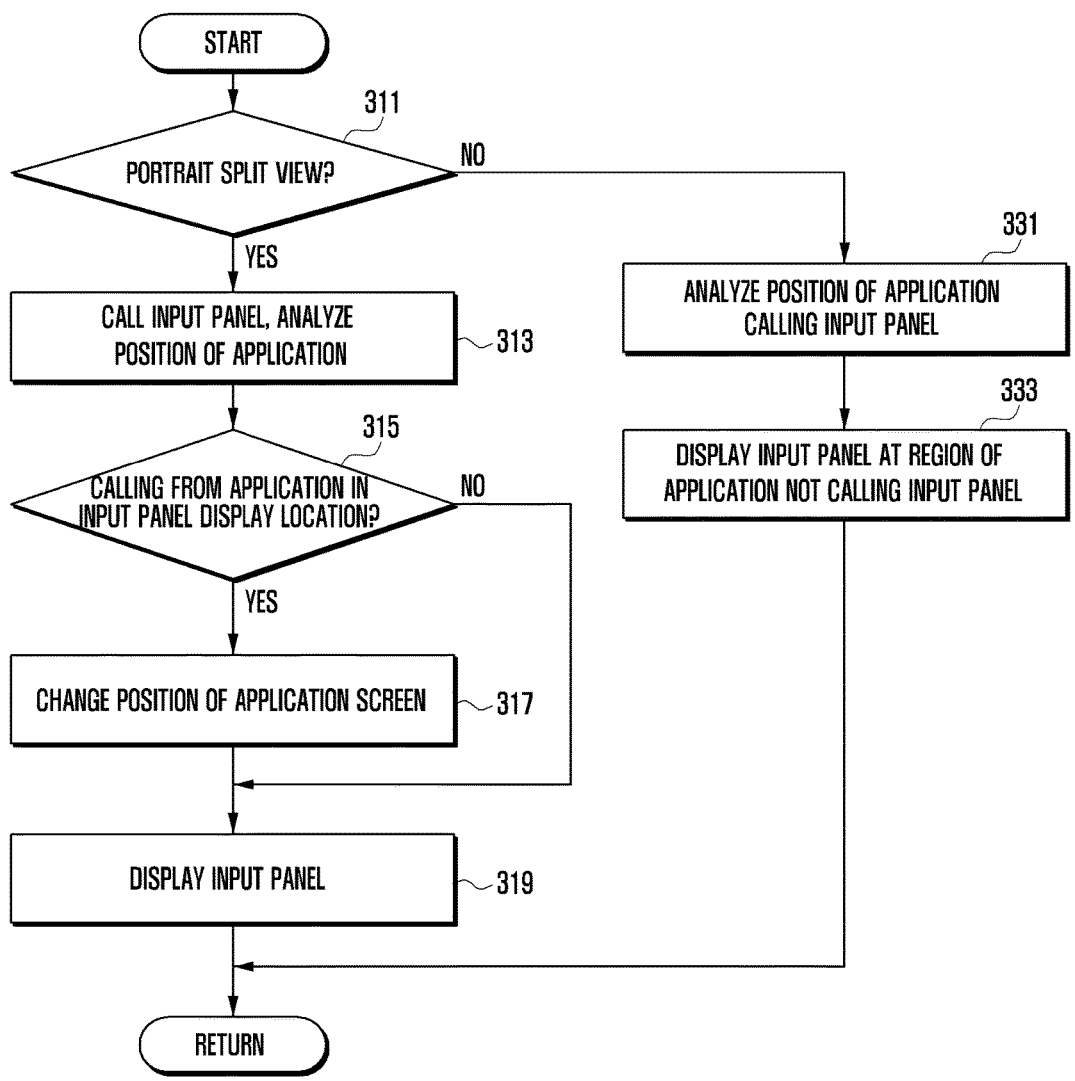
FIG. 3 is a flowchart illustrating operation of a method of display an input panel in a portable device for displaying a split view according to an exemplary embodiment of the present invention.

FIG. 3 is a flowchart illustrating operation a method of display an input panel in a portable device for displaying a split view according to an exemplary embodiment of the present invention. FIGS. 4A, 4B, 4C, 4D, 4E and 4F are respective views illustrating examples of displaying an input panel in a portrait mode in FIG. 3, and FIGS. 5A and 5B are views illustrating examples of displaying an input panel in a landscape mode in FIG. 3.

Referring now to FIGS. 3 to 5B, at (311) a controller 100 analyzes a display mode of a split view. The controller 100 may analyze an output of a sensor 160 to confirm a display mode of a display unit 130. More particularly, if the output of the sensor 160 is analyzed by the controller 100, and the controller determines that the portable device is vertically oriented, the controller 100 configures and outputs a split view in a portrait mode to a display unit 130. If the controller determines that the portable device is horizontally oriented, the controller 100 configures and outputs a split view in a landscape mode to the display unit 130.

When the split view displayed on the display unit 130 is in the portrait mode, at (311) the controller 100 detects the split view in the portrait mode and analyzes a display region (e.g., a position of a split view on which the application calling the input panel is displayed) of an application calling the input panel (313).

In this case, the input panel may be displayed at a fixed position of the display unit 130. In a case of the portrait mode, a display position of the input panel may be set at a bottom region of the display unit 130. Accordingly, when the input panel is displayed, such a display may be overlaid with an application (that is, the bottom separation view region in a split view). In this case, when an application calling the input panel is located at a bottom region of the display unit 130, a display region of the application may be changed to a top display region of the application.

Accordingly, if the application calling the input panel is located at a bottom display region, at (315) the controller 100 detects and at (317) changes a position of the application calling the input panel, and at (319) displays the input panel at a preset position (bottom region of the display unit 130). In this case, a method of changing a position of a split view in the application may include a method of lifting the split view and a method of changing a display position of applications displayed on the split view.

However, at (315) if a position of a split view on which the application calling the input panel is displayed is different from a position on which the input panel will be displayed, the controller 100 detects this difference in position and at (319) displays the input panel at a preset position (bottom region of display unit 130).

As described above, when the split view is displayed in a portrait mode, in this embodiment of the present invention, if change of the split view displaying an app is necessary, a method of lifting a display region of the app and a method of changing a display position of apps may be used.

When change of the split view is necessary in the portrait mode, a method of setting a position of the input panel by lifting the split view and a method of exchanging and displaying positions of applications displayed on the split view may be used.

First, the method of setting a position of the input panel by lifting the split view will now be described. The controller 100 confirms a display position of an application calling the input panel (i.e., position of split view). When the input panel is called from an App located at a top display region of the display unit, the input panel is displayed to shield App(s) of a bottom end based on the App calling the input panel. However, when the input panel is called from an App located at a bottom end, the controller 100 controls the App calling the input panel lifts App(s) of a top based on the App calling the input panel to provide the input panel. In this case, some of the adjacent Apps from among the Apps lifted according to a region size of the input panel are shown on a screen. Some of the adjacent Apps are shown on a screen for the purpose of selecting another App during operation of the application using the input panel.

Figure 4A:
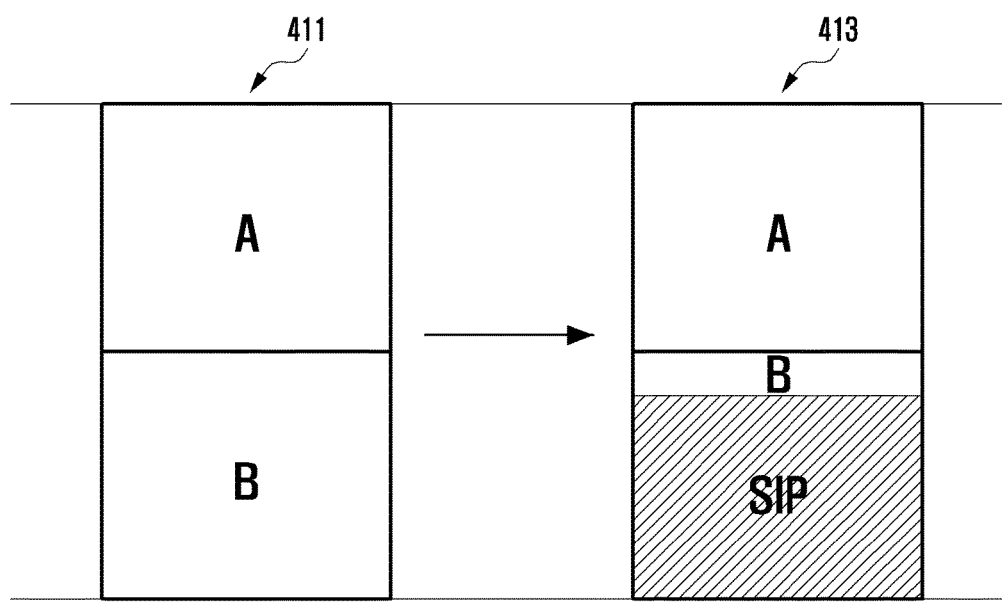
FIG. 4A, FIG. 4B, FIG. 4C, FIG. 4D, FIG. 4E and FIG. 4F are views illustrating examples of displaying an input panel in a portrait mode of FIG. 3.
Figure 4B:
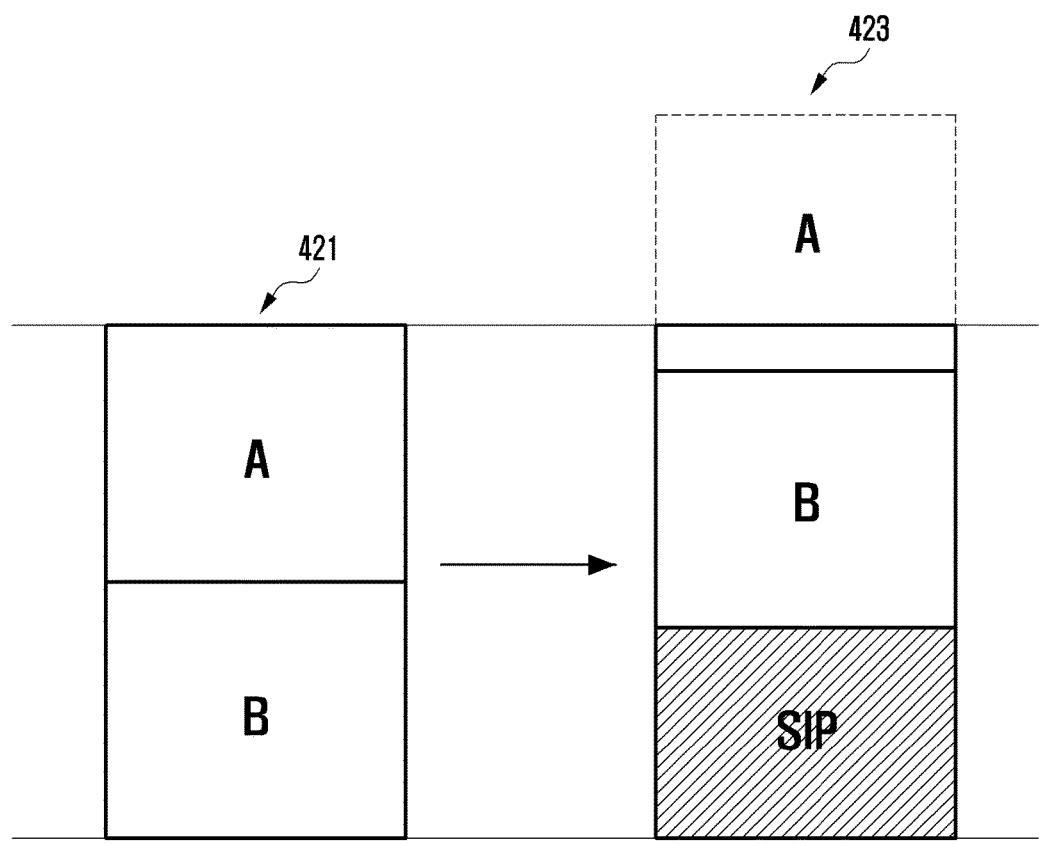
Figure 4C:
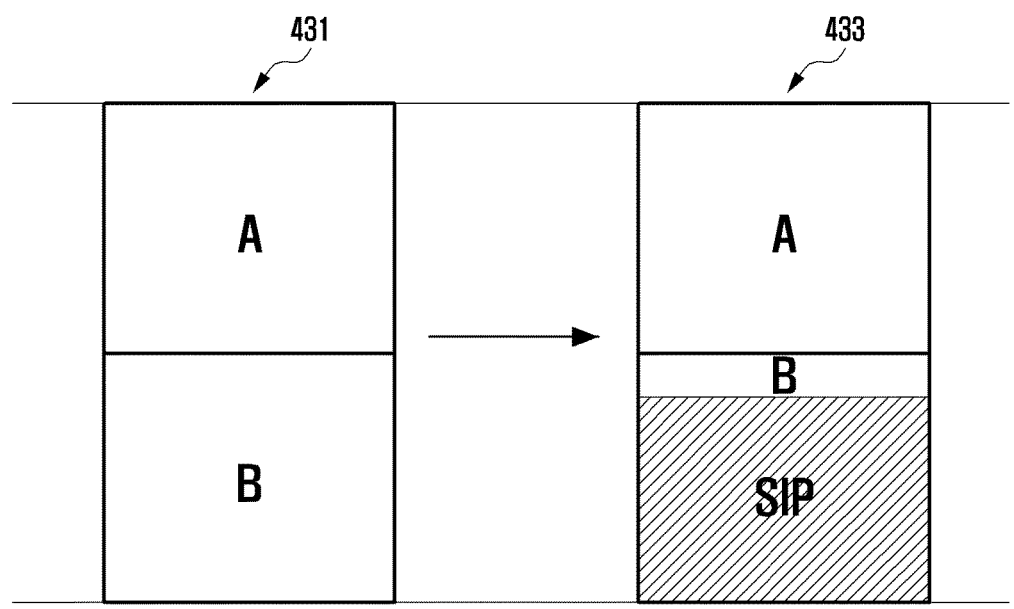
Figure 5A:
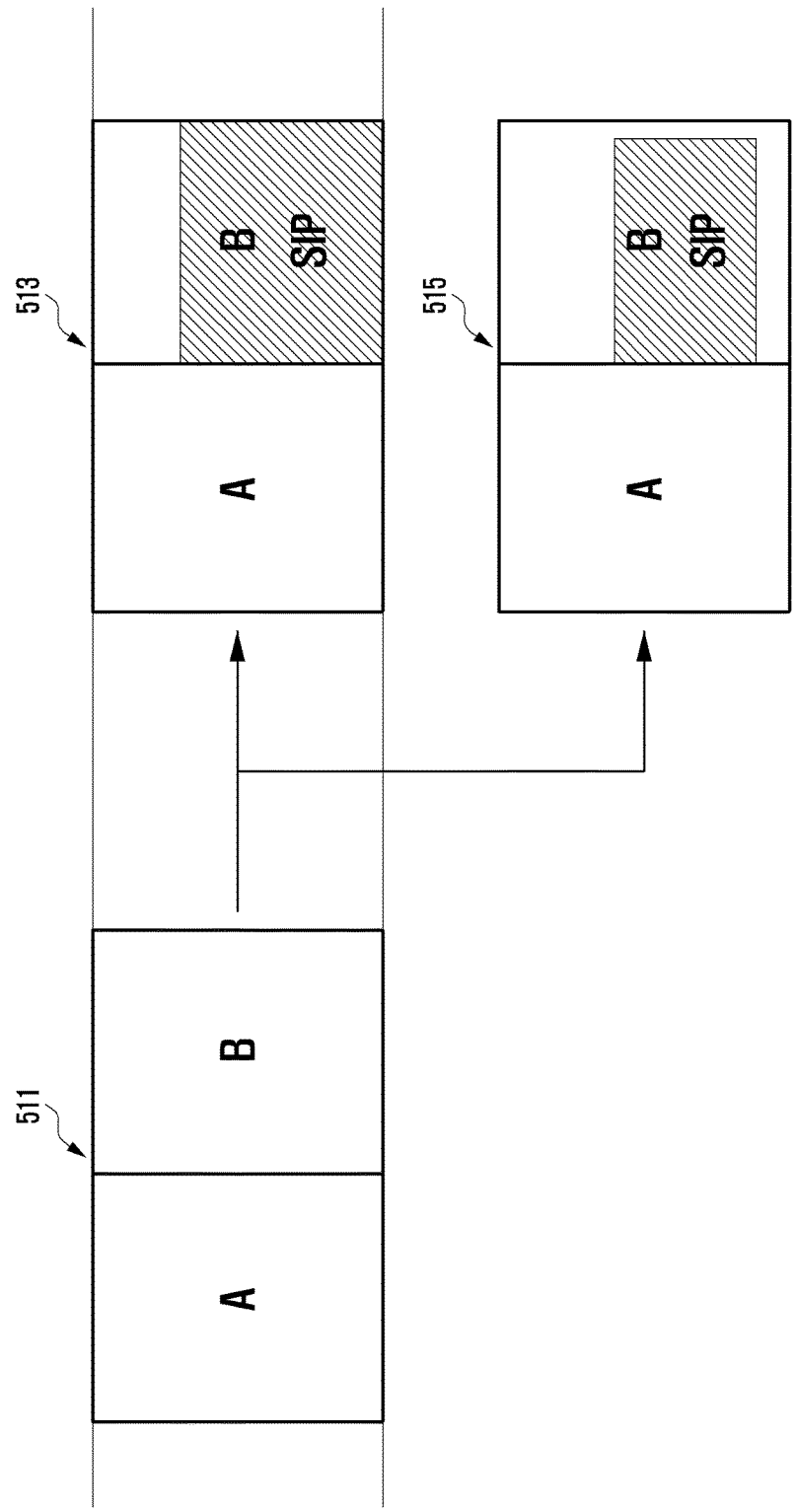
FIG. 5A and FIG. 5B are views illustrating examples of displaying an input panel in a landscape mode of FIG. 3.
Figure 5B:
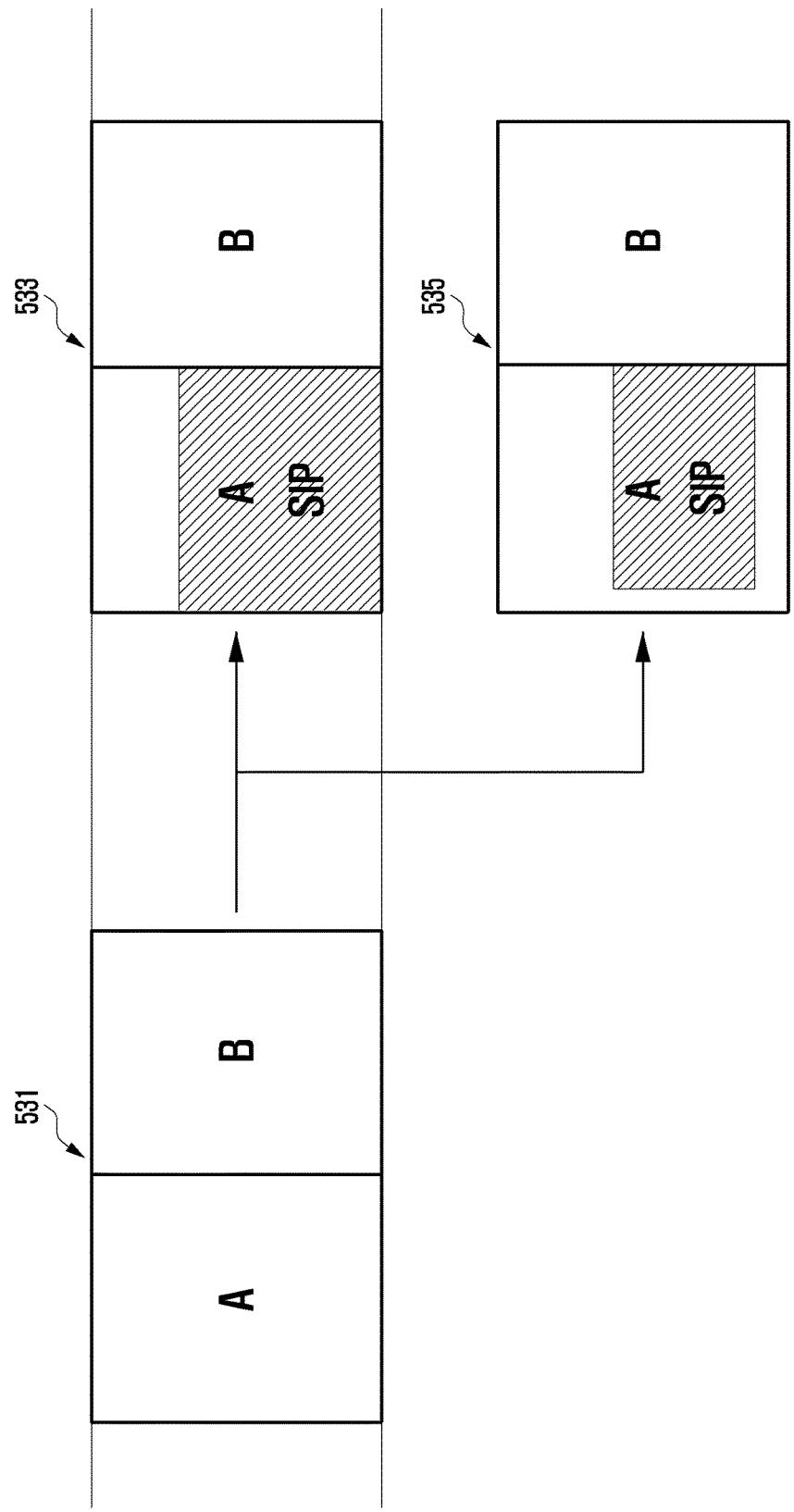

For example, if an application "A" calls for the input panel in a state that applications A and "B" are displayed on a split view as illustrated in 411 of FIG. 4A, the controller 100 displays on a split view region of the application B located on a bottom region of the display unit 130 as illustrated in 413 as being overlaid. In this case, a part of a display region of the application B shielded by the input panel is displayed. When the application B calls for the input panel in a state that the applications A and B are displayed on the split view as illustrated in 421 of FIG. 4B, the controller 100 lifts a display region of the applications B and A located on a bottom region of the display unit 130 as illustrated in 433, and displays the input panel on a bottom region of the display unit. In this case, some of display regions of the lifted application A are viewed.

Secondly, the method of changing a position of the split view in the portrait mode will now be described. The controller 100 confirms a display position (i.e., position of split view) of the application calling the input panel. When the input panel is called from an App located at a top display region of the display unit, the input panel is displayed to shield App(s) of a bottom end based on the App calling the input panel. However, when an App located at a bottom end calls for the input panel, the controller 100 exchanges a split view position between the App calling the input panel and an app not calling the input panel (that is, the app calling the input panel is moved to the split view position located at the top region), and displays the input panel as being overlaid with a display region of another application which is exchanged in the bottom region. In this case, some of the applications displayed on a bottom end region are shown on a screen according to a region size of the input panel. The part of the application is shown on the screen for the purpose of selecting another app while operating the application using the input panel.

Figure 4D:
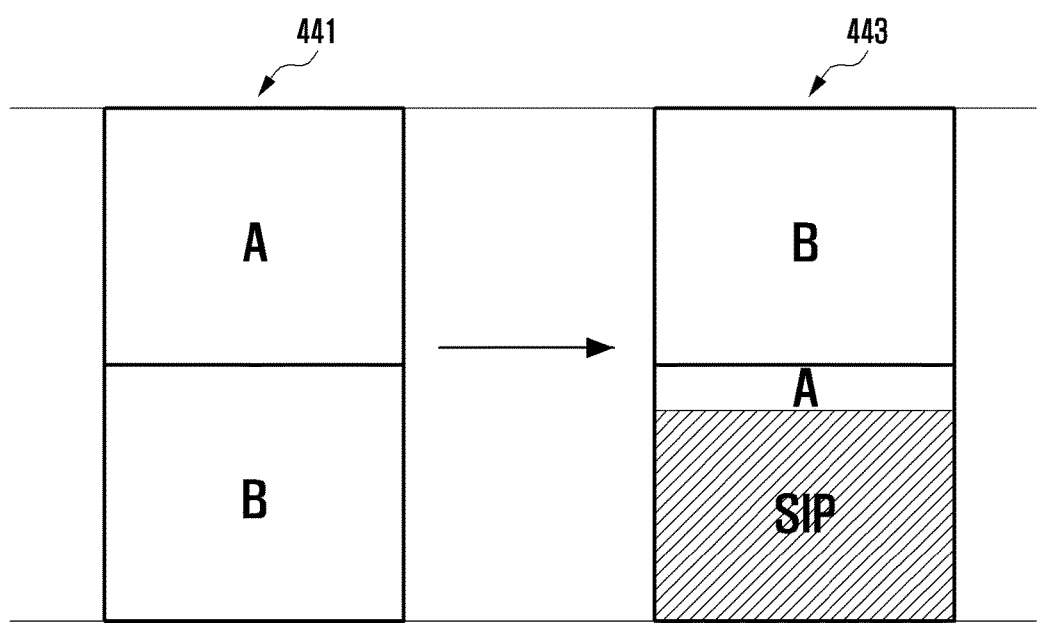

If the application A calls for the input panel in a state that the applications A and B are displayed on the split view as illustrated in 431 of FIG. 4D, the controller 100 displays the input panel to be overlaid with a split view region of the application B located on a bottom region of the display unit 130 as illustrated in 433. In this case, a part of the display region of the application B shielded by the input panel is displayed. If the application B calls for the input panel in a state that the applications A and B are displayed on the split view as illustrated in 421 of FIG. 4D, the controller 100 exchanges display regions of the applications A and B of the display unit 130 as illustrated in 433. Accordingly, the application B is displayed on a top region of the display unit 130, the application A is displayed on a bottom region of the display unit 130, and the input panel is displayed as being overlaid with the application A in a bottom region of the display unit 130. In this case, some of display regions of the application in which the display region is changed are viewed.

Figure 4E:
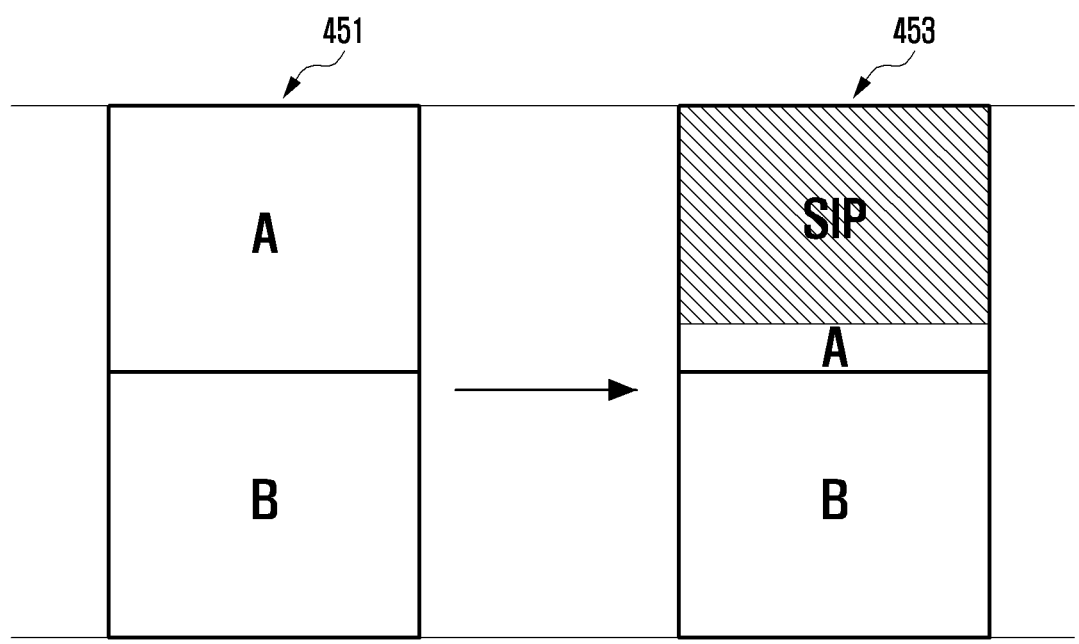
Figure 4F:
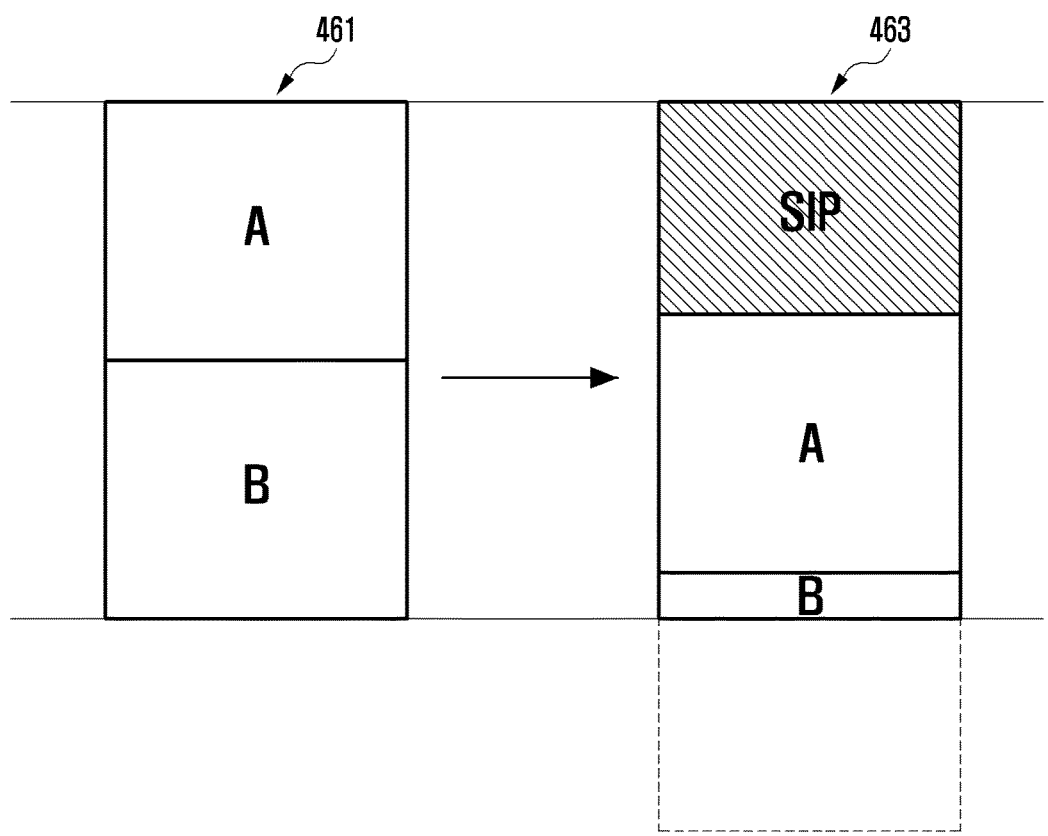

Thirdly, the input panel may be displayed on a top region of the display unit 130 in the portrait mode. In this case, if the application B calls for the input panel in a state that a split view as illustrated in 451 of FIG. 4E is displayed, the controller 100 displays the input panel as being overlaid with the top region of the application A as illustrated in 453. However, when the application A calls for the input panel in a state that a split view as illustrated in 461 of FIG. 4F is displayed, the controller 100 downs the applications A and B as illustrated in 463 by the size of the input panel, and displays the input panel at a corresponding position. In cases of FIGS. 4E and 4F, some of display regions of the application in which the display region is changed are viewed.

With reference to FIG. 3, if at (311) it is determined that the display mode is a landscape mode, at (331) the controller 100 analyzes a display region position of the application calling the input panel, and displays at (333) the input panel at a region of an application not calling the input panel. In an embodiment of the present invention, the input panel is provided to an opposite direction of a focus area of a split view (1/N Split view) in the landscape mode. In other words, the controller 100 positions the display of input panel in a region of the split view except for the selected region in the landscape mode. In this case, the input panel may include, for example, a Qwerty or 3*4 key pad or a key board and may support one hand mode. The one hand mode is a mode where the user may operate the input panel by a right hand or a left hand, and an input panel in the one hand mode has a size smaller than a size of an input panel upon using a both hand mode.

In an embodiment of the present invention, the input panel may be generated at a fixed position to have a fixed size, and may be provided in the form of an input panel (Floating SIP) capable of moving a position according to Static SIP within a predetermined region or a user setting. Accordingly, the controller 100 performs tasks 311 and 333 while the display is in the landscape mode. When an App located at a left side based on the center calls for the input panel, the controller 100 controls display of the input panel at an opposite App display region adjacent to the calling App, and Static SIP or Floating SIP may be selectively provided within a predetermined region of the displayed input panel.

When the application calls for the input panel in a state that the portable device displays a split view in a landscape mode, the controller 100 displays an input panel an opposite direction of a split view (Focused region of 1/N Split) on which the application calling the input panel is displayed as illustrated in FIGS. 5A and 5B. In this case, an SIP type of the input panel supports Full Qwerty, 3*4 key or an input panel of one hand mode.

For example, as illustrated in 511 of FIG. 5A, if an App A located at a left side calls for the input panel in a state that a split view of the landscape mode is displayed, the controller 100 displays an input panel as being overlaid with an opposite App B adjacent to the App A as illustrated in 513 or 515. In this case, the input panel may be provided in the form of Static SIP within a predetermined region as illustrated in 513 or in the form of a Floating SIP as illustrated in 515.

Further, as illustrated in 531 of FIG. 5B, when an App B located in a right split view calls for the input panel in a state that a split view in a landscape mode is displayed, the controller 100 may display the input panel as being overlaid with a split view region of an opposite App A adjacent to an App B as illustrated in 533 or 535. In this case, the size of the input panel may be provided in the form of Static SIP within a predetermined region as illustrated in 533 or in the form of Floating SIP as illustrated in 535.

Figure 6:
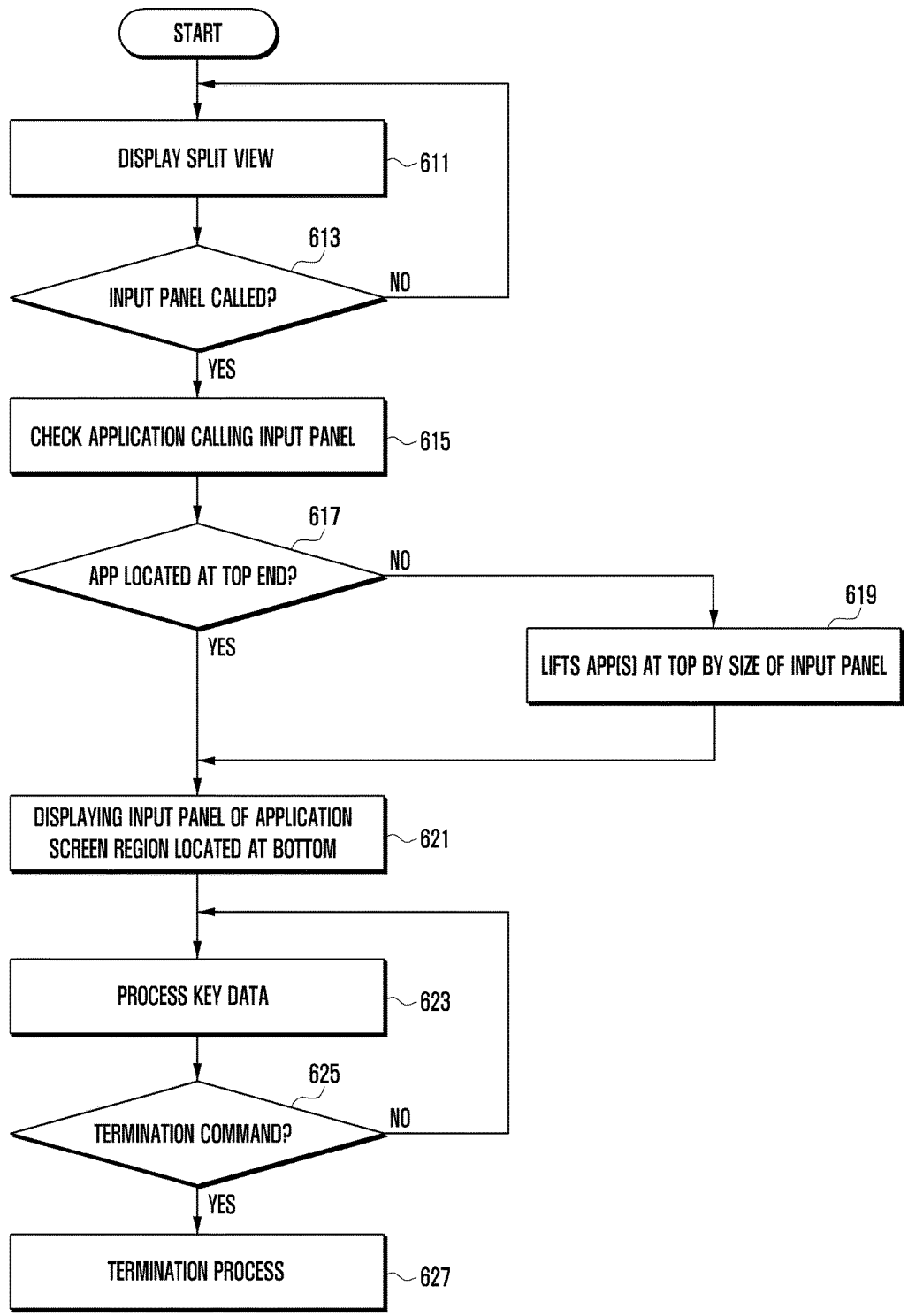
FIG. 6 is a flowchart illustrating operation of a method of processing an input panel in a portrait mode in a portable device having a split view display function.

FIG. 6 is a flowchart illustrating operation of a method of processing an input panel in a portrait mode in a portable device having a split view display function according to another exemplary embodiment of the present invention.

Referring now to FIG. 6, at (611) a controller 100 controls the display of N applications on corresponding N split views. The split view is layout on one layer, and displays a corresponding application. As described above, the number of split views may be determined according to the number of displayed applications, and applications displayed on the split views may be set in various schemes. In an embodiment of the present invention, as illustrated above, the user may select desired apps from among a collection of apps and display the selected apps on the split view. In this case, apps may be selected from a currently executed app (running application), a recently executed app (recently run application) or the entirety of the apps (e.g., applications displays on home screen). Further, an execute app calls for another app to display as a split view. Specific apps may include app switch task information requiring switch to another app, and the app switch task information may include Insert/Attach/Link/Preview/Browse. Accordingly, when a corresponding app is executed, a corresponding app may be called and may be displayed on the split view. Apps displayed on the split view may be determined by a manufacturing company, and the user may determine specific apps in a preset mode (registration mode).

If user selects an input panel from a split view region displaying a predetermined application in a state that the above split view is displayed, at (613) the controller 100 detects the selected input panel and detects that the input panel is called. In this case, the input panel may be called when a character input window is selected during executing the application.

For example, the input panel may be called when the user selects an Internet search window or selects a character input window for inputting memo or schedule.

In this case, as shown in FIGS. 4A and 4B, it is assumed that a display mode of the split view is a portrait mode, the input panel uses a method of lifting and displaying an application.

At (617), the controller 100 determines whether the application calling the input panel is an application of a top split view. The controller 100 confirms a display position of the application calling the input panel (that is, position of a split view). In this case, if an App displayed on a top split view of the display unit calls for the input panel at (617), the controller 100 displays the input panel (621) to shield App(s) based on the App calling for the input panel. If the application A calls for the input panel in a state that applications A and B are displayed on the split view as illustrated in 411 of FIG. 4A, the controller 100 displays the input panel to overlaid with a split view region of the application B located at a bottom region of the display unit 130 as illustrated in 413 of FIG. 4A. Further, the input panel may be displayed to have the size capable of displaying a part of a display region of the application B.

However, when an App located at a bottom end calls for the input panel, at (617) the controller 100 detects it and the App calling for the input panel at (619) lifts App(s) at a top end by a size of the input panel based on the App calling the input panel, and at (621) displays the input panel. In this case, a part of an adjacent App among lifted Apps according to a region size of the input panel is viewed. If the application B calls for the input panel in a state that applications A and B are displayed on a split view as illustrated in 421 of FIG. 4B, the controller 100 lifts a display region of the applications A and B located at a bottom region of the display unit 130 as illustrated in 433 of FIG. 4C by the size of a display region of the input panel, and displays the input panel at a bottom region of the display unit. In this case, some of the lifted display regions of the application A are viewed. The input panel may include a 3*4 or qwerty key pad (or key board). Further, the input panel may include an input panel (Static SIP) having a fixed size within a predetermined region and an input panel (Floating SIP) having the size and a position which may be changed.

As described, after the input panel is displayed, at (623) the controller 100 processes key data detected through a first input unit 140 and/or a second input unit 150.

Next, if a termination command is generated, at (625) the controller 100 detects the generated termination command, and at (627) terminates display of the input panel and restores the display of the split view to an original state. For example, as illustrated in 413 of FIG. 4A or 423 of FIG. 4B, the split view is changed to a previous state as illustrated in 411 or 421 to be displayed.

As described above, if the input panel is called from a predetermined application in a state that a split view is displayed in a portrait mode, the controller 100 examines a position of a split view of an application calling the input to display the input panel. In this case, when the input panel is called from an App located at a top, the controller provides an input panel to shield App(s) of a bottom end based on an App calling the input panel. In addition, when the input panel is called from the App located at the bottom end, the controller lifts App(s) at a top end based on the App calling the input panel to provide the input panel. In this case, some of adjacent Apps among lifted Apps according to the size of the input panel should be shown on a screen. Further, use of the input panel is terminated, the split view of the application is restored to an original provision state of the input panel.

The portable device according to an embodiment of the present invention can efficiently display the input panel in an efficient screen configuration while ensuring display regions of respective applications (1/N Split App) of the split view in a multi-window. The portable device according to the embodiment of the present invention can provide the input panel while sufficiently ensuring 1/N Split App region, and accordingly a display region of the application minimize obstacle due to display of the input panel to efficiently display the input panel on the screen.

The above-described methods according to the present invention can be implemented in hardware, firmware or via the execution of software or computer code that configures hardware for operation, and is stored on a non-transitory machine readable medium such as a CD ROM, DVD, RAM, a floppy disk, a hard disk, or a magneto-optical disk, such as a floptical disk or computer code downloaded over a network originally stored on a remote recording medium or a non-transitory machine readable medium and stored on a local non-transitory recording medium, so that the methods described herein can be loaded into hardware such as a general purpose computer, or a special processor or in programmable or dedicated hardware, such as an ASIC or FPGA. As would be understood in the art, the computer, the processor, microprocessor controller or the programmable hardware include memory components, e.g., RAM, ROM, Flash, etc. that may store or receive software or computer code that when accessed and executed by the computer, processor or other hardware implement the processing methods described herein. In addition, it would be recognized that when a general purpose computer accesses code for implementing the processing shown herein, the execution of the code transforms the general purpose computer into a special purpose computer for executing the processing shown herein. In addition, an artisan understands and appreciates that a "processor" or "microprocessor" comprise hardware in the claimed invention. Under the broadest reasonable interpretation, the appended claims constitute statutory subject matter in compliance with 35 U.S.C. § 101.

The terms "unit" or "module" as used herein is to be understood under the broadest reasonable interpretation as constituting statutory subject matter under 35 U.S.C. § 101 and does not constitute software per se. When a unit or module includes machine executable code it is to be understood that a non-transitory machine readable medium contains the machine executable code that is loaded into hardware such a processor or controller for execution.

Although exemplary embodiments of the present invention have been described in detail hereinabove, it should be clearly understood that many variations and modifications of the basic inventive concepts herein taught which may appear to those skilled in the present art will still fall within the spirit and scope of the present invention, as defined in the appended claims.

What is claimed is:

1. An electronic device comprising:
    a display;
    at least one processor; and
    a memory configured to store instructions which, when executed by the at least one processor, cause the at least one processor to:
    control the display to display a first execution screen of a first application together with a second execution screen of a second application, the second execution screen being disposed below the first execution screen;
    when a first input for calling a soft input panel is detected in the first execution screen, control the display to display the soft input panel together with the first execution screen and a first portion of the second execution screen; and
    when a second input for calling the soft input panel is detected in the second execution screen, control the display to display a portion of the first execution screen and a second portion of the second execution screen together with the soft input panel being disposed below the second execution screen,
    wherein the second portion of the second execution screen comprises the first portion of the second execution screen.

2. The electronic device of claim 1, wherein the instructions, when executed by the at least one processor, further cause the at least one processor to:
    in response to receiving a termination command, terminate a display of the soft input panel and restore a display screen to an original state.

3. The electronic device of claim 1, wherein the soft input panel has a fixed size and position.

4. The electronic device of claim 1, wherein the soft input panel comprises a floating input panel, and wherein at least one of a position and a size of the floating input panel are changeable in response to a user input.

5. The electronic device of claim 1, wherein the instructions, when executed by the at least one processor, further cause the at least one processor to:
    when the first input for calling the soft input panel is detected in the first execution screen, control the display to display the soft input panel to be overlaid on at least a portion of the first portion of the second execution screen.

6. The electronic device of claim 1, wherein the instructions, when executed by the at least one processor, further cause the at least one processor to:
    when the second input for calling the soft input panel is detected in the second execution screen, control the display to display the soft input panel together with a lower portion of the first execution screen and the second portion of the second execution screen.

7. The electronic device of claim 1, wherein the instructions, when executed by the at least one processor, further cause the at least one processor to:
    identify whether the electronic device is in a portrait mode, prior to displaying the second execution screen of the second application below the first execution screen of the first application.

8. An electronic device comprising:
    a display;
    at least one processor; and
    a memory configured to store instructions which, when executed by the at least one processor, configure the at least one processor to:
    control the display to display a first execution screen of a first application and a second execution screen of a second application on a screen of the display as a split view, the second execution screen being displayed below the first execution screen;
    in response to a first input on an input window of the first execution screen, control the display to display a keyboard on at least a portion of the second execution screen; and
    in response to a second input on an input window of the second execution screen, move the first execution screen and the second execution screen in an upper direction and control the display to display the keyboard below the second execution screen.

9. The electronic device of claim 8, wherein the instructions, when executed by the at least one processor, further configure the at least one processor to:
    in response to receiving a termination input, control the display to re-display the first execution screen and the second execution screen on the screen as the split view,
    wherein the first execution screen and the second execution screen occupy substantially an entire view area of the screen.

10. The electronic device of claim 8, wherein the keyboard has a fixed size and position.

11. The electronic device of claim 8, wherein the keyboard comprises a floating keyboard wherein at least one of a positon and a size of the floating keyboard are changeable in response to a user input.

12. The electronic device of claim 8, wherein the instructions, when executed by the at least one processor, further configure the at least one processor to:
    when the input window of the first execution screen is selected, control the display the keyboard to be overlaid on the at least a portion of the second execution screen.

13. The electronic device of claim 8, wherein the instructions, when executed by the at least one processor, further configure the at least one processor to:
    when the input window of the second execution screen is selected, control the display the keyboard together with a lower portion of the first execution screen and the second execution screen on the screen.

14. The electronic device of claim 8, wherein the instructions, when executed by the at least one processor, further configure the at least one processor to:
    identify whether the electronic device is in a portrait mode, prior to displaying the second execution screen below the first execution screen.

15. An electronic device comprising:
a display;
at least one processor adapted to:
control the display to display a first execution screen of a first application and a second execution screen of a second application as a split view, the second execution screen of the second application being displayed below the first execution screen;
in response to selecting a first input window in the first execution screen, control the display to display a keyboard on at least a portion of the second execution screen; and
in response to selecting a second input window in the second execution screen, move the first execution screen and the second execution screen in an upper direction and control the display to display the keyboard below the second execution screen.

16. A method of an electronic device comprising:
displaying a first execution screen of a first application and a second execution screen of a second application on a screen of the display as a split view, the second execution screen being displayed below the first execution screen;
in response to a first input on an input window of the first execution screen, displaying a keyboard on at least a portion of the second execution screen; and
in response to a second input on an input window of the second execution screen, moving the first execution screen and the second execution screen in an upper direction and displaying the keyboard below the second execution screen.

17. The method of claim 16, further comprising:
in response to receiving a termination input, re-displaying the first execution screen and the second execution screen on the screen as the split view,
wherein the first execution screen and the second execution screen occupy substantially an entire view area of the screen.

18. The method of claim 16, further comprising:
when the input window of the first execution screen is selected, displaying the keyboard to be overlaid on the at least a portion of the second execution screen.

19. The method of claim 16, further comprising:
when the input window of the second execution screen is selected, displaying the keyboard together with a lower portion of the first execution screen and the second execution screen on the screen.

20. The method of claim 16, further comprising:
identifying whether the electronic device is in a portrait mode, prior to displaying the second execution screen below the first execution screen.

* * * * *